US008321938B2

(12) United States Patent
Strayer et al.

(10) Patent No.: US 8,321,938 B2
(45) Date of Patent: Nov. 27, 2012

(54) MULTI-TIERED SCALABLE NETWORK MONITORING

(75) Inventors: William Timothy Strayer, West Newton, MA (US); Walter Milliken, Dover, NH (US); Ronald Joseph Watro, Bedford, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 959 days.

(21) Appl. No.: 12/369,973

(22) Filed: Feb. 12, 2009

(65) Prior Publication Data

US 2010/0202299 A1 Aug. 12, 2010

(51) Int. Cl.
H04L 12/26 (2006.01)
(52) U.S. Cl. .............. 726/23; 726/1; 726/4; 726/13; 726/14; 726/25
(58) Field of Classification Search ............... 726/23
See application file for complete search history.

(56) References Cited

U.S. PATENT DOCUMENTS

| 4,849,661 | A | * | 7/1989 | Bazes ................ | 326/71 |
| 4,950,927 | A | * | 8/1990 | Boudon et al. .......... | 326/47 |
| 5,233,607 | A | * | 8/1993 | Barwig et al. ........... | 370/397 |
| 5,440,243 | A | * | 8/1995 | Lyon .................. | 326/33 |
| 5,757,249 | A | * | 5/1998 | Gabara et al. ........... | 333/101 |
| 5,757,796 | A | * | 5/1998 | Hebb ................ | 370/393 |
| 6,195,543 | B1 | * | 2/2001 | Granberg .............. | 455/407 |
| 7,356,585 | B1 | | 4/2008 | Brook et al. | |
| 7,376,969 | B1 | | 5/2008 | Njemanze | |
| 7,430,760 | B2 | * | 9/2008 | Townsend et al. ........ | 726/13 |
| 7,533,413 | B2 | * | 5/2009 | Samuelsson et al. ...... | 726/22 |
| 7,661,123 | B2 | * | 2/2010 | Fakes et al. ............ | 726/1 |
| 7,680,799 | B2 | * | 3/2010 | Jackson et al. .......... | 707/770 |
| 7,685,148 | B2 | * | 3/2010 | Engquist et al. ......... | 709/201 |
| 7,765,594 | B1 | * | 7/2010 | Bennett et al. .......... | 726/22 |
| 8,104,080 | B2 | * | 1/2012 | Burns et al. ............ | 726/14 |
| 2004/0123141 | A1 | | 6/2004 | Yadav | |
| 2005/0044422 | A1 | * | 2/2005 | Cantrell et al. .......... | 713/201 |
| 2008/0205358 | A1 | * | 8/2008 | Jokela ................ | 370/338 |

OTHER PUBLICATIONS

International Search Report mailed Sep. 21, 2010 in corresponding International Application No. PCT/US2010/023727.

* cited by examiner

Primary Examiner — Kambiz Zand
Assistant Examiner — Yonas Bayou
(74) Attorney, Agent, or Firm — Chapin IP Law, LLC

(57) ABSTRACT

A network analysis architecture provides a suite of complementary logic operable at different temporal and spatial timescales. The distinct temporal and spatial scales define different tiers, each analyzing network events according to predetermined temporal and spatial scales of progressive magnitude. Particular event detection logic may be operable on an immediate temporal scale, while other logic identifies trends over a longer time period. Similarly, different spatial scales are appropriate to different algorithms, as in logic that examines only headers or length of packets, or inspects an entire payload or transferred file. Deployment of logic that is focused on different timing and scope of data allows timely action in the case of readily apparent deviations, and permits longer term analysis for identifying trends that emerge over time. By selecting a suite of complementary logic directed at different deviant behavior, the focus of a single logic scheme is not charged with producing absolute screening of all traffic.

19 Claims, 7 Drawing Sheets

MULTI-TIERED SCALABLE NETWORK MONITORING

GOVERNMENT RIGHTS

This invention was made with Government support under Contract No. N66001-08-C-2050, awarded by DARPA. The Government has certain rights in this invention.

BACKGROUND

Modern computer networks employ a variety of safeguards against undesirable transmission. Commonplace media coverage of identity theft, breaches divulging sensitive information such as credit card numbers, and spyware that parasitically embezzles part or all of a host CPU for unauthorized usage, all underscore the need for network protection. Such network protection typically takes the form of intrusion detection measures deployed at strategic points in the network, and on the actual computer systems that may harbor such undesirable programs, typically called malware.

Security mechanisms for defending networks against malicious cyber attacks must evolve along with the emergence of new attacks and the development of new communication technologies that form the network. Early attacks destroyed data, disabled hosts, or disrupted portions of the network. These were brute force and reasonably easy to detect. Modern attacks are subtler, and serve a growing economy of stolen personal, commercial, or nationally held information. High speed switching fabrics and transmission technologies, and new protocols supporting a vast array of powerful applications, mean that cyber attacks have many new vectors of penetration, and traditional signature-based and anomaly detection-based defensive measures are simply inadequate in both speed and function.

SUMMARY

As widespread usage of networked computing, most notable the Internet, continues to increase, network detection of undesirable transmissions allows scrutiny of network traffic of a multitude of users, rather than relying on individual users to install and execute malware protection measures. Network-based malware protection and other intrusion detection mechanisms typically operate by observing network traffic at particular points in the network and invoking algorithms (logic) directed as particular patterns or trends associated with undesirable activity. Such exhaustive observation by sniffing and interception, however, can result in a substantial magnitude of message traffic for evaluation and analysis. Whereas modern network speeds are outstripping computing capability, the timing window with which to effectively scrutinize message traffic is continually narrowing. In modern networks, it can be problematic to provide complete coverage with a single algorithm operating at a fixed temporal or spatial (scope of data) scale.

Unfortunately, conventional intrusion detection algorithms suffer from the shortcoming that they rely on logic that tends to be myopically focused on a particular pattern, occurrence, or trend. Such conventional algorithms do not look to or correlate with other algorithms to identify complementary information that may collectively denote a notable occurrence, i.e. an event that has a high likelihood of indicating undesirable behavior. Configurations herein are based, in part, on the observation that each definable network event may not necessarily indicate an alert that should be recognized and acted upon, but rather may be a normal operational occurrence. Often it is repeated occurrences or patterns of otherwise normal events that indicate suspect activity. Further, broadening the conventional approach raises timing issues, particularly with high bandwidth network lines, as there is simply insufficient time to receive and process all transmitted data in a timely manner. Scaling the conventional approach imposes further constraints, such as apportioning the volume of message traffic for parallel processing.

Configurations herein substantially overcome these shortcomings of conventional analysis of high bandwidth network lines by providing a suite of complementary logic operable at different temporal and spatial timescales. The distinct temporal and spatial scales define different tiers, each analyzing events according to predetermined temporal and spatial scales of progressive magnitude. Certain intrusion detection logic may be operable on an immediate temporal scale, while other logic may identify trends over a longer time period. Similarly, different spatial scales are appropriate to different algorithms, as in logic that examines only headers or length of packets, or inspects an entire payload or transferred file. Deployment of logic that is focused on different timing and scope of data allows timely action in the case of readily apparent deviations, and permits longer term analysis for identifying trends that emerge over time. By selecting a suite of complementary logic, or algorithms, directed at different deviant behavior, the focus of a single logic scheme is not charged with or expected to produce absolute screening of all traffic. In this manner, exhaustive processing at the expense of throughput rate is not needed because the complementary nature of the logic suite suggests that deviant behavior will trigger an event somewhere among the suite of logic.

In an example configuration herein, a three-tier approach to the logic suite is demonstrated as a particular arrangement of spatial and temporal variance among intrusion detection logic using network element, aggregate, and archive tiers. A network element tier disposes specialized sensors on a network line for identifying specific formats or patterns of data from very high-speed lines. In the example configuration, the line speed at which these network elements operate is on the order of 10-100 Gbs/s. It is a premise of this tier that high speed operation without impeding the underlying traffic flow is a priority, with the recognition that all patterns or packets may not be available within the given time window. At a second level is an aggregate tier which receives data structures populated by the sensors of the network element tier and operates on data from multiple sensors. While processing speed is important, per-packet turnaround at line speed is not required, as multiple sensory inputs are permitted to complement each other to identify an event. A third archive tier includes logic for analyzing current data in light of historical trends observed from previous traffic. The archive tier is therefore directed to events that are not directly tied to a single packet or occurrence.

One of the most pressing challenges imposed on network defense mechanisms is the significant increase in network speeds. While the well-known Moore's Law states that computing power doubles every eighteen months, a lesser know authority states that communication power doubles every six, suggesting that bandwidth grows at least three times faster then computer power (George Gilder, TELECOSM: How Infinite Bandwidth will Revolutionize Our World, Free Press/Simon & Shuster, 2000). This is a harsh reality for computer network defense; the implication is that defensive strategies must be inherently scalable, or they become moment-in-time solutions. It is a long-term waste to invest in defensive solutions that cannot match the performance curve.

Scalable attack detection algorithms must operate efficiently and effectively without regard to the bandwidth of the input. Since bandwidth triples with computation power, it is impossible to consider "scalable" algorithms without also considering the scalability of the corresponding execution environment. The increasing volume of input also implies that there is less time available to investigate each alert issued by the algorithms, precipitating the need to have fewer, higher valued alerts. Therefore, a truly scalable solution to network monitoring requires innovation not only in scalable algorithms themselves, but also in the ability to extract and process traffic features at line speeds.

In further detail, the disclosed method of gathering network traffic for analysis of undesirable trends includes defining a plurality of tiers for gathering network traffic, such that each of the plurality of tiers has a temporal scale and spatial scale independent of the others of the plurality of tiers. The temporal scale defines the timing of observed packets and the spatial scale defines a scope of analysis performed on observed packets. The method gathers, according to the temporal scale of at least one of the tiers, data from the network traffic, in which the gathered data defines an event, and analyzes, according to the spatial scale of at least one of the tiers, the gathered network data. Analysis logic specific to each tier determines, based on the analyzing, if the analyzed data indicates an alert indicative of remedial operations, and generates, if an alert is indicated, a responsive action directed to the indicated remedial operations.

Gathering the data further includes gathering, according to the temporal scale of the plurality of the tiers, a plurality of events, and the subsequent analysis includes analyzing according to the plurality of spatial scales from which the analyzed data was gathered. The tiers, shown in further detail below with respect to FIG. 3, include a network element tier for gathering and analyzing events at a line speed of the network traffic, and an aggregate tier for gathering and analyzing events from multiple sources. An archive tier provides similar processing as the aggregate tier 182 over events 148 spanning a longer temporal scale (time range). Thus, the defined plurality of tiers include a network element tier having element logic, such that the element logic executes at a line speed of the network traffic, which may be on the order of 10-100 Gbs/s. The element logic analyzes the event within a temporal scale of the line speed and a spatial scale defined by traffic gathered at a deployment point of the network element, thus allowing a very small window of opportunity in such a high speed network.

In the example configuration discussed further below, the network element tier includes sensors specialized for a predetermined purpose, and gathering the data includes gathering a portion of the network traffic flow, typically a particular position or range of bytes in the analyzed packet. The gathered portion is predetermined according to the particular sensor deployed in the respective network element, and directed to an event defined by a single condition. The complementary aggregated tier has aggregate logic operating on data structures received from the network element tier, in which the aggregate logic has a temporal scale of a plurality of events and a spatial scale of a plurality of deployed network elements.

Configurations discussed below disclose (1) a collection of novel scalable attack detection logic, (2) a flexible and extensible architecture for implementing and deploying the logic, and (3) the execution environment suitable for traffic inspection, feature extraction, and algorithm execution at extremely high line rates using network element as collectors for non-intrusively "sniffing" data packets at line speed.

Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
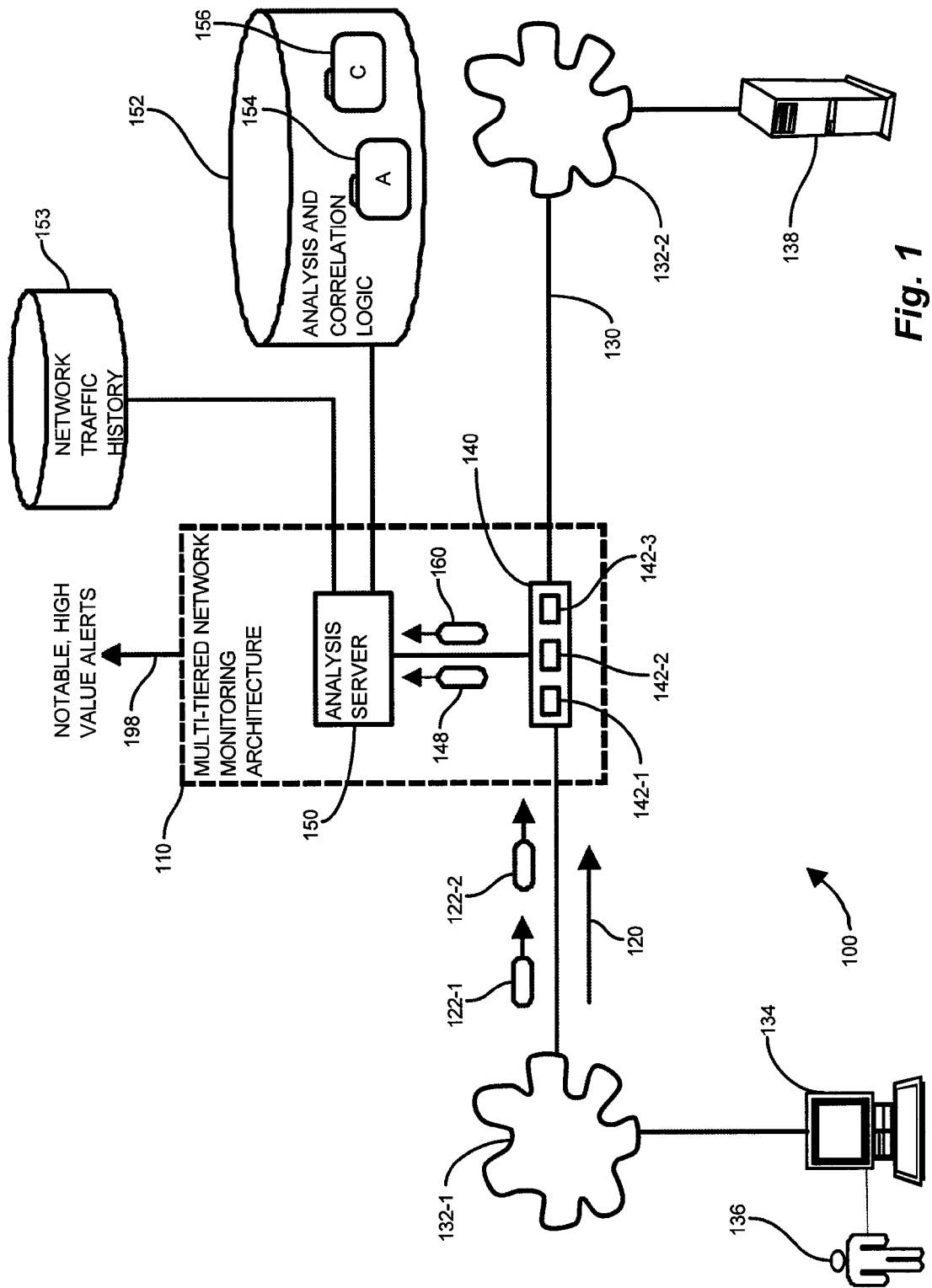
FIG. 1 shows a context diagram of a managed information environment including a multi-tiered network monitoring architecture suitable for use with the present invention.

In an example configuration herein, the three-tier approach to the logic suite is demonstrated as a particular arrangement of spatial and temporal variance among intrusion detection logic. The network element tier disposes specialized sensors on a network line for identifying specific formats or patterns of data from very high-speed lines. At the second level is an aggregate tier which receives data structures populated by the sensors of the network element tier and operates on data from multiple sensors. While processing speed is important, in contrast to the element tier, per-packet turnaround at line speed is not required, as multiple sensory inputs complement each other to identify an event. A third archive tier includes logic for analyzing current data in light of historical trends observed from previous traffic.

In the example configuration presented, the sensors, or data collectors, in the network elements (elements) define the network element tier to extract features and other information from the network traffic, and place that data into data structures within the network elements. Disposed in the elements, thus very close to the actual traffic, certain algorithms will execute on the data collected, and these algorithms will produce "events" as they detect evidence of certain types of attacks. Such network elements require appropriate network interfaces to read the network traffic, and appropriately constructed memory and computational modules to allow the algorithms to run at line speed. The algorithms in the network elements need operate only on the traffic seen at the point where they are deployed in the network.

Data collected at one or more network elements is sent to aggregators that define the aggregate tier. These components store the data in data structures appropriate for the class of algorithms that require a broader view of the network—that is, data collected at multiple sources. Legacy data collectors, such as so-called snort-based IDSes, firewalls, and routers with NetFlow (as is known in the art) turned on, can also send data into the aggregators. The aggregate logic in the aggregate tier also produces events based on the evidence of attacks.

A further archive tier serves as a long-term repository for some of the data collected by the above measures. The archive tier archives the data into one or more databases, where a third class of algorithms look for attack clues that only become evident by examining historical trends. Again, these algorithms produce events.

The event correlation analyzer (correlator) takes as input the events generated by the various algorithms and, using models of both attack profiles and normal network behavior kept in the correlation knowledge base, explores a space of hypotheses to determine which events are truly high value alerts.

It should be noted that a feature of the disclosed architecture is that it supports algorithms that operate on different temporal and spatial scales. The class of algorithms that require per packet inspection run in the network elements, close to the data source, with results generated nearly immediately upon collecting the data. Those algorithms that require a collection of data from a broader area are housed in the aggregate tier (aggregator), where data is aggregated from various data sources. Since the data is collected and forwarded to the aggregator, the results are generated while attacks are active or have recently occurred. The algorithms that reside in the archive tier operate over network-wide data and produce results that are not necessarily tied to the timing of any particular attack.

In certain arrangements, the network element and aggregate tiers provide substantial breadth of coverage, and the longer term archive tier is less significant as historical trend data may not be particularly valuable. In contrast to conventional algorithms that scan for particular byte sequences associated with harmful code, the approach disclosed herein is more akin to medical diagnosis or crime forensics, in that information that points to more likely causes or situations is addressed before pursuit of less likely causes. Events may be occurrences that are completely permissible within the protocol/policy of the network, however taken in the context of other events may indicate undesirable behavior, although none of the contributing events alone would appear suspect.

In contrast to conventional approaches that rely on alerts generated from a single algorithm, configurations herein focus on a suite of intrusion detection logic selected on a complementary basis such that the collective events resulting across the suite identify conditions that should be raised as alerts. Correlation of the information received from the suite of detection logic yields the events that define alerts, and thus that are worthy of further notation. Thus, an individual event resulting from a particular sequence of logic (algorithm or detection method) in the suite may be insignificant until correlated with a complementary event from another logic sequence.

The multi-tiered approach to monitoring and analysis as disclosed further below takes the form of an example 3-tiered approach. The three tiers include a network sensor, or element tier, an aggregate tier, and an archive tier, each having increasing temporal and spatial scales. A further feature of the disclosed approach includes selection of a complementary suite of detection logic, or algorithms, for operation at each tier. Selection of complementary logic avoids false alerts that tend to arise in conventional, myopic-view approaches by correlating events from the multiple tiers that, taken alone, could be construed as normal or allowed behavior.

The disclosed detection logic suite is therefore selected from a set of algorithms that complement and correlate information to derive high-value alerts from events. For example, one class of logic is directed to traffic behavior. This class of logic examines behavior that is not itself in violation of a protocol, but may indicate behavior or patterns that are indicative of or tend to be associated with undesirable behavior. At the network element tier, traffic behavior scrutiny includes measuring the so called "entropy," or address diversity of remote peers, and the number of external address blocks being sent. Accordingly, a high address diversity can be a telltale sign that a node is being surreptitiously employed for expanding undesirable behavior via each of the remote peers.

An example of detection logic complementation includes so-called botnet detection, referring to the multitude of computers surreptitiously invoked via malware propagation. For example, a set of sensors is directed to botnet detection by monitoring the address diversity of a node (i.e. how many peers, or other IP addresses, the node is in contact with). A high address diversity may be indicative of polling or scanning remote systems in rapid succession looking for a vulnerability.

Another pattern of events that may lead to an alert is a change in the pattern of countries to which remote addresses are directed. Since intrusions often operate via addresses emanating in remote countries, such a change may indicate underhanded behavior. Again, however, such behavior is not in necessarily violation of a protocol or policy, but has been observed to lend a higher degree of association with deviant behavior. For example, detection of so called "botnets" accumulates remote address references emanating from a particular node (computer). Typical normal (non-malware) activity results in a certain number of remote address references over a given time. An excessive number of external references may be indicative of undesirable behavior, such as scanning for unprotected systems or a denial of service (DoS) attack.

FIG. 1 shows a context diagram of a managed information environment including a multi-tiered network monitoring architecture suitable for use with the present invention. Referring to FIG. 1, the managed information environment 100 includes a multi-tiered monitoring architecture 110 for monitoring network traffic 120 on a network connection, or line 130 between network entities, such as the example subnetworks 132-1, 132-2 (132 generally). As is known in computer networks, message traffic 120 travels between network entities 132, typically from a user node 134, such as a PC or laptop under the control of a user 136 to a host, server or peer node 138, however the analysis depicted herein is applicable to message traffic 120 between any suitable network entities 132.

The multi-tiered network monitoring architecture (architecture) 110 includes at least one analysis server (server) 150 operable for executing computer programs having instructions for implementing analysis logic 154 and correlation logic 156 stored in an analysis and correlation logic database (DB) 152. The server 150 includes an interface 160, such as a network tap, to a network card 140 in communication with the network connection 130, or line, for nonintrusively reading the message traffic 120. Each tier of the multi-tiered architecture analyzes the message traffic on different spatial and temporal scales to generate events 148. The events 148 are received by the server 150 so that correlation of the events 148 received from the different tiers to identify alerts for which merely one of the constituent events may have been deemed insignificant or overemphasized, but within the context of the different tiers, each invoking complementary logic, results in alerts 198 having a likelihood of substantiality. The network card 140 has one or more sensors 142-1 . . . 142-3 (142 generally) for reading at least a portion of the message traffic 120 on the line 130 and passing it up to the analysis server 150.

As will be explained in further detail below, the first tier of analysis occurs on the card 140 where, due to the high speed nature of the line 130, the sensors 142 process a predetermined portion of the network traffic for making immediate decisions at line speed for particular anomalies in the message traffic 120. Typically, the message traffic 120 takes the form of packets 122-1 . . . 122-2 (122 generally) adhering to a protocol, such as TCP/IP, as is known in the art. The specialized nature of the sensors 142 is such that they are optimized to look for certain portions of the packets 122, such as headers, payloads, and other fields, and identify predetermined patterns or sequences defined as events. Such line speed analysis is usually not achievable with standard network analysis hardware, hence the need for the specialized sensors 142 operating using microcode and/or Field Programmable Gate Arrays (FPGA) implementations in order to accommodate the line speed of the message traffic 120.

Figure 2:
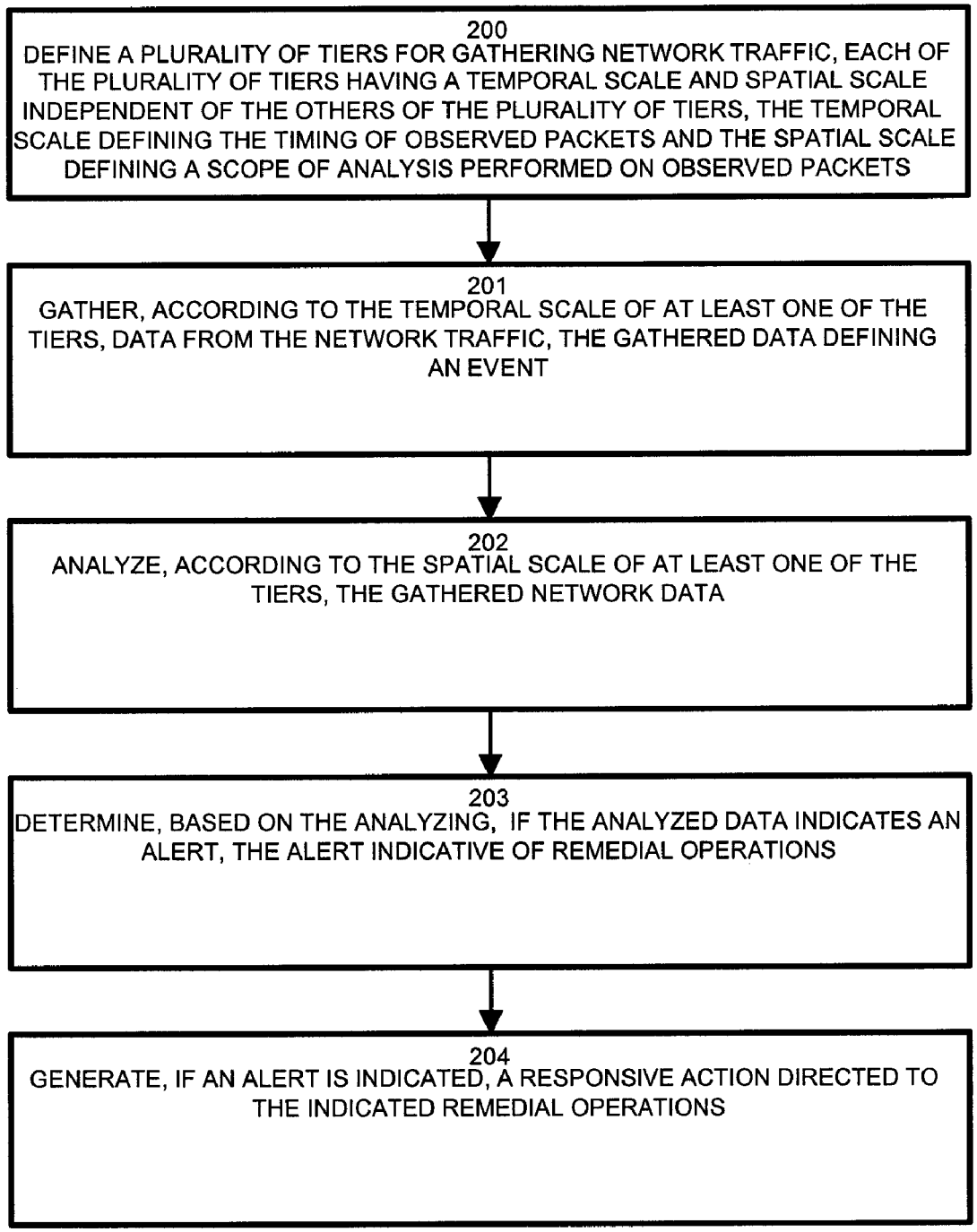
FIG. 2 is a flowchart of network analysis in the environment of FIG. 1.

FIG. 2 is a flowchart of network analysis in the environment of FIG. 1. Referring to FIGS. 1 and 2, the method of gathering network traffic for analysis of undesirable trends includes defining a plurality of tiers for gathering network traffic, in which each of the plurality of tiers has a temporal scale and spatial scale independent of the others of the plurality of tiers. The temporal scale defines the timing of observed packets 122 and the spatial scale defines a scope of analysis performed on observed packets 122, as disclosed at step 200. The temporal scale refers to the timing for gathering and computing a result, and the spatial scale refers to the scope of the data gathered and analyzed. The tiers generally encompass a range from a narrow temporal and spatial scale to a more inclusive temporal and spatial scale, as the increased timing allows for greater depth of analysis.

The method gathers, according to the temporal scale of at least one of the tiers, data from the network traffic 122, in which the gathered data defines an event, as depicted at step 201. Configurations herein are based, in part, on the observation that each definable network event 148 may not necessarily indicate an alert 198 that should be recognized and acted upon. Rather, configurations herein overcome the shortcoming that devoting attention to each event is inefficient, and tends to dilute those events that are deserving of further action or investigation. Accordingly, the analysis logic 154 attempts to identify, from multiple events 148, high value alerts 198 deserving of further consideration. The analysis server 150 analyzes, according to the spatial scale of at least one of the tiers, the gathered network data 160, as shown at step 202, and determines, based on the analyzing, if the analyzed data indicates an alert, the alert indicative of remedial operations, as shown at step 203.

In the example shown, the high speed sensors 142 operating at line speed quickly analyze packets 122, and may make an immediate decision about the packet 122 depending on particular patterns that the sensor is operable to detect, and/or populates data structures 160 to pass to the aggregate tier for correlation with data structures 160 from other sensors 142 operable for detection of other patterns. Thus, the network card 140 may generate both events 148 and data structures 160 for further analysis. Based on the gathered data 160 and events 148, the architecture 110 generates, if an 198 alert is indicated, a responsive action directed to the indicated remedial operations, as depicted at step 204. Alerts 198 may be generated from data gathered from a signal tier, as via a sensor 142 detected pattern, or from correlation with data 160 from multiple tiers. Thus, alerts 198 are construed by both correlation of multiple, possibly innocuous, events and from discrete events 148 that alone define an actionable condition.

Figure 3:
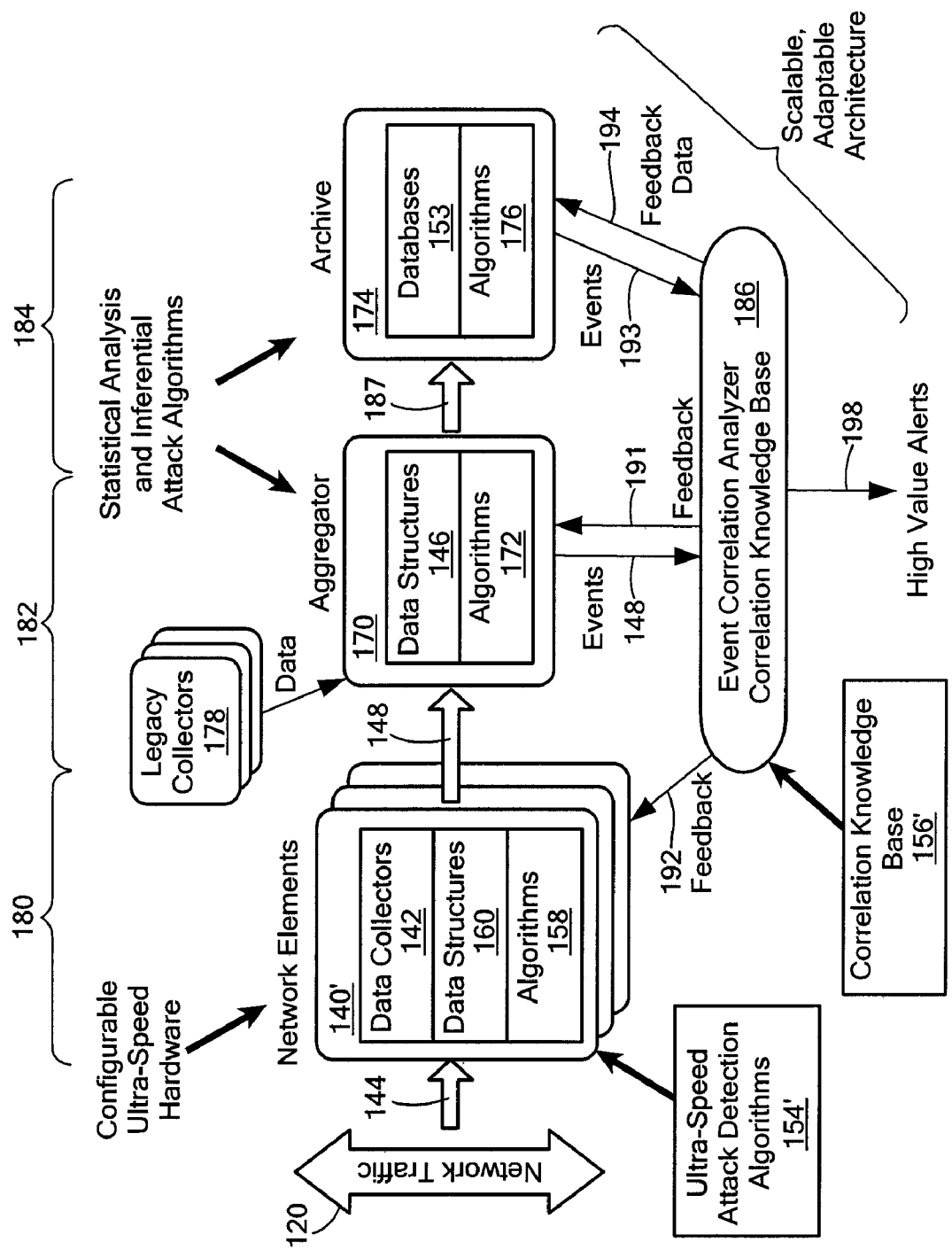
FIG. 3 depicts data flow of network analysis in the architecture of FIG. 1.

FIG. 3 depicts the data flow of network analysis in the architecture of FIG. 1. Referring to FIGS. 1 and 3, the flow of information across the tiers 180, 182, 184 of the multi-tiered architecture 110 is shown. A plurality of network elements 140', such as the network cards 140 (which may be included in other network elements such as switches, routers and bridges) define the network element tier 180 and receive the message traffic 120 via a line speed connection 144, typically a bus in the network element 140', that noninvasively receives, or "sniffs" the message packets 122 by data collectors such as the sensors 142. The data collectors (sensors) 142 populate data the structures 160 for use by analysis logic 154, including analysis algorithms 158. As each tier 180, 182, 184 of the multi-tiered architecture 110 gathers data from different temporal contexts, the data structures 160 may be acted upon immediately by the algorithms 158 or may be passed up to the aggregator 170.

The aggregator 170 gathers the data structures 146 from the multiple sensors 142, and invokes aggregation algorithms 172 from the analysis logic 154 for operation on the data structures 146 from the multiple sensors 142, in contrast to the immediate analysis from a single sensor at the element tier 180. The aggregator 170 denotes the second tier 182 of the example multi-tiered architecture 110, and performs rapid processing from multiple sensors 142 to allow correlation of the data structures 146. Data structures 146 that define an event 148 are passed to an event correlation analyzer 186 for consideration of a corresponding alert, shown by arrow 198. The event correlation analyzer 186, in communication with each of the tiers 180, 182, 184 employs the correlation logic 156 from the database 152 for analyzing the plurality of data structures 160, 146, and for providing feedback 191 to the aggregator 170, shown by arrow 172, for analyzing successive data structures 160, 146. As the element tier 180 performs line speed processing, it may receive feedback 192 from the event correlation analyzer (correlator) 186, however the temporal scale is such that correlation analysis is not feasible, thus defining the differing temporal scales of the element tier 180 and the aggregation scale 182. Further, the aggregate tier 182 includes legacy data collectors 178, such as snort-based IDSes, firewalls, and routers with NetFlow turned on, that can also send data into the aggregator 170. This logic as well as other conventional malware detection mechanisms also produce events 148 based on the evidence of attacks.

An archive analyzer 174 receives trend data 187 from the aggregator 170, which may include events 190 and event trend data, such as less granular data in a statistical form, for storage and analysis. The traffic database 153 stores archived events for use with historical analysis algorithms 170 that examine data trends not tied to a single particular event 148. The historical analysis algorithms 170 identify notable events 193 in view of the historical data 153, and pass the events 193 to the correlator 186. The temporal scale is long term, and the spatial scale includes events that, taken alone are generally not indicative of improper or illegal behavior, but taken in view of historical trends may indicate undesirable transmissions. Feedback data 194 also provides indicators of trend data 187 that constitutes further events 193.

Figure 4:
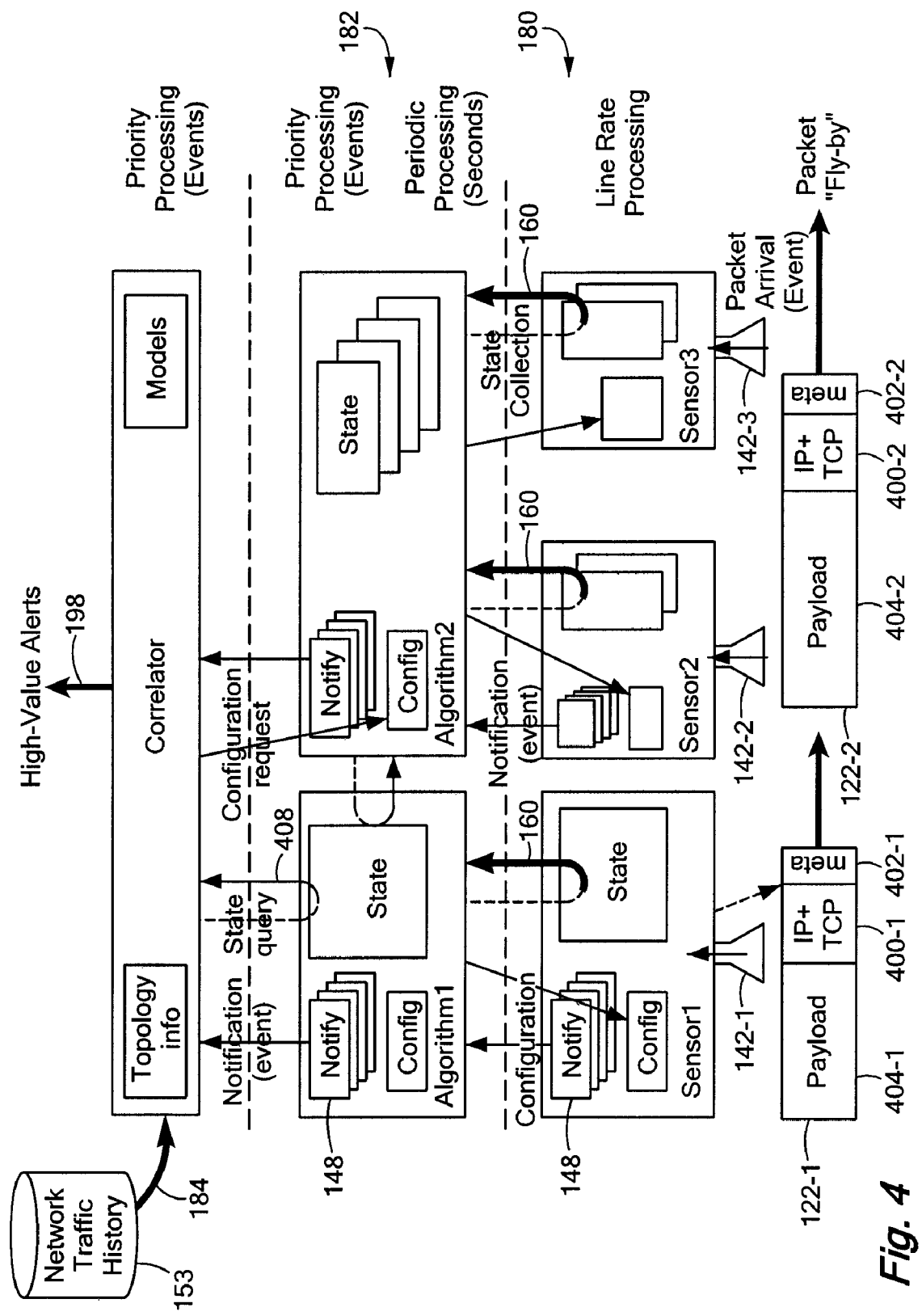
FIG. 4 is a block diagram of network analysis in the server of FIG. 1.

FIG. 4 is a block diagram of network analysis in the server of FIG. 1. Referring to FIGS. 1, 3 and 4, the example three tiers 180, 182 and 184 generally direct event data to the correlator 186 for determination of events 148 that constitute high-value alerts 198. In the example configuration disclosed herein, the network element tier 180 generates events 148 based on the sensor 142 input, and sends data structures 160 including state information to the aggregate tier 182. The aggregate tier also generates events 148 and further state information for receipt by the correlator 186. The historical traffic database 153 denotes the third tier and likewise delivers message traffic 120 spanning a longer temporal scale. The correlator 186 invokes the analysis logic 154 to refine the noted events 148 into high value alerts having lower false positive and false negative rates than the events 148 alone.

At the network element tier 180, line rate processing occurs as the message traffic 120 passes by the sensors 142 at the line rate of the connection 130, a so-called packet fly-by operation due to the non-intrusive nature of the detection (i.e. the packets 122 continue unhindered to their intended destination 138). As indicated above, this line speed processing allows only about 5-50 ns per packet at a line speed on the order of 10-100 Gb/s. Thus, conventional processing mechanisms employing typical DDR memory is ineffective to perform any type of per-packet analysis. Each packet 122 in the example arrangement includes a header 400-1,400-2, metadata 402-1, 402-2, and a payload 404-1, 404-2. The sensors 142 therefore employ specialized detection mechanisms and feature extraction techniques to examine and analyze particular portions of the message packet 122. For example, one type of sensor 142 may examine the origination field of the header 400, while another may scrutinize the payload 404 for a predetermined value. As each sensor 142 is specialized to identify only a particular sequence, feature, or field, the entire packet need not be analyzed by any particular sensor 142, thus the sensor 142 can perform it's highly specialized tack at line speed. The combination of multiple sensors 142, each with a dedicated focus, provides the network element tier 180 operable at line rate processing of the high speed connection 130. The aggregate tier 182 collectively receives the events 148 and corresponding data structures 160 from each of a plurality of sensors 142 at the element tier 180, and therefore can perform analysis in the context of multiple sensor inputs. The archive tier 184 also performs analysis based on multiple occurrences/instances, and all tiers 180, 182 and 184 are responsive to the correlator 186.

Figure 5:
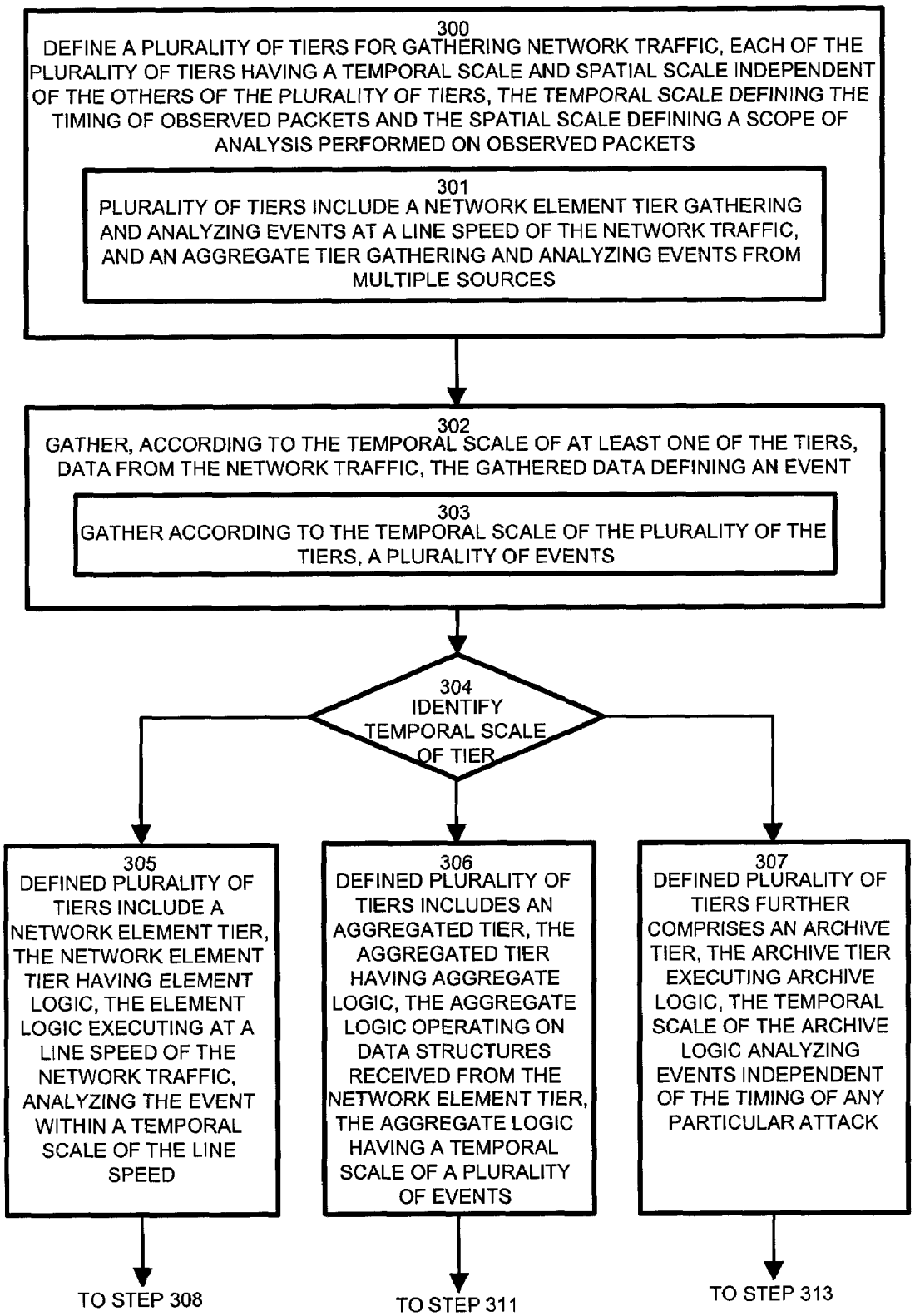
FIGS. 5-7 are a flowchart of multi-tiered analysis logic according to FIG. 4.
Figure 6:
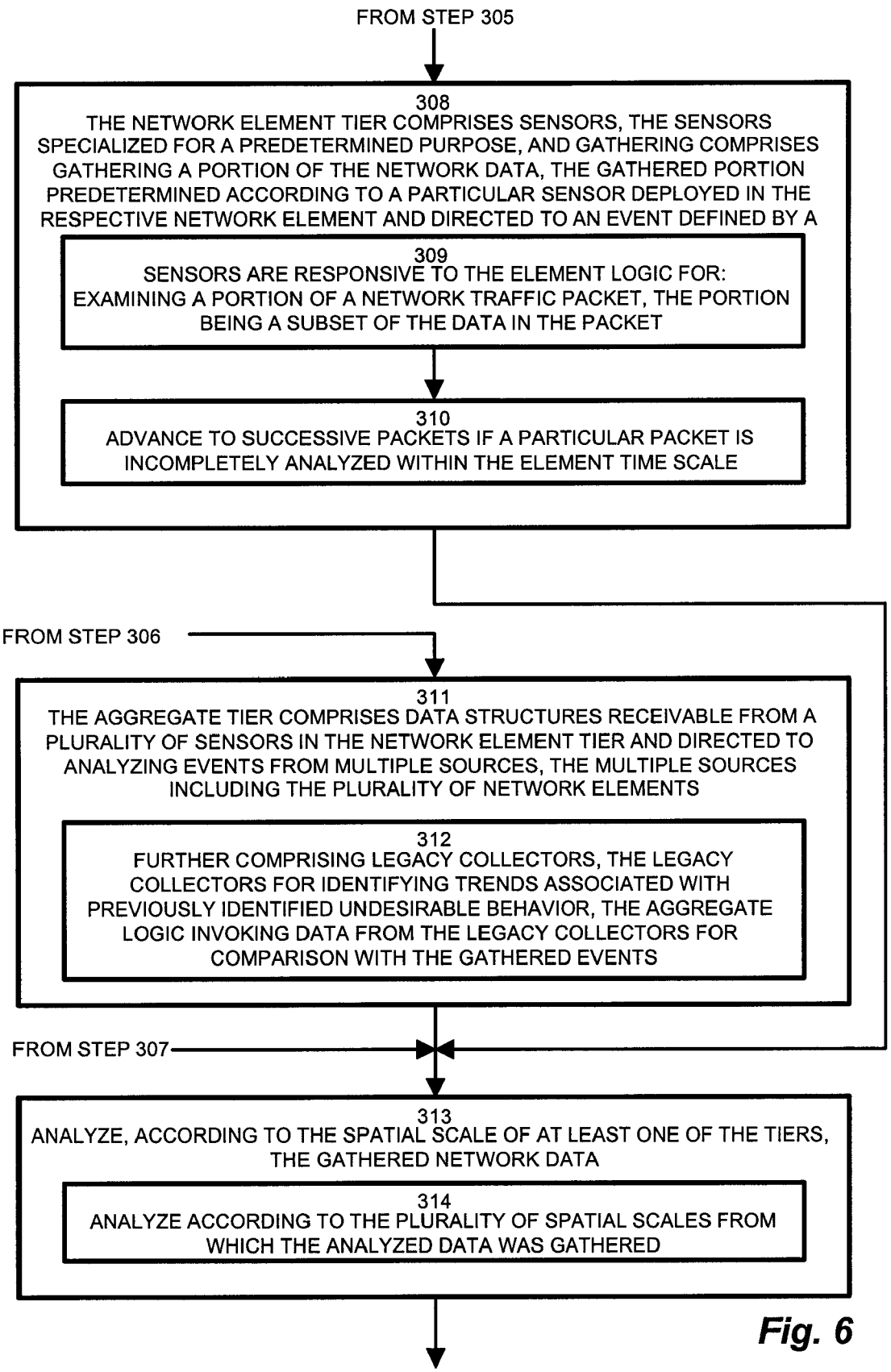
Figure 7:
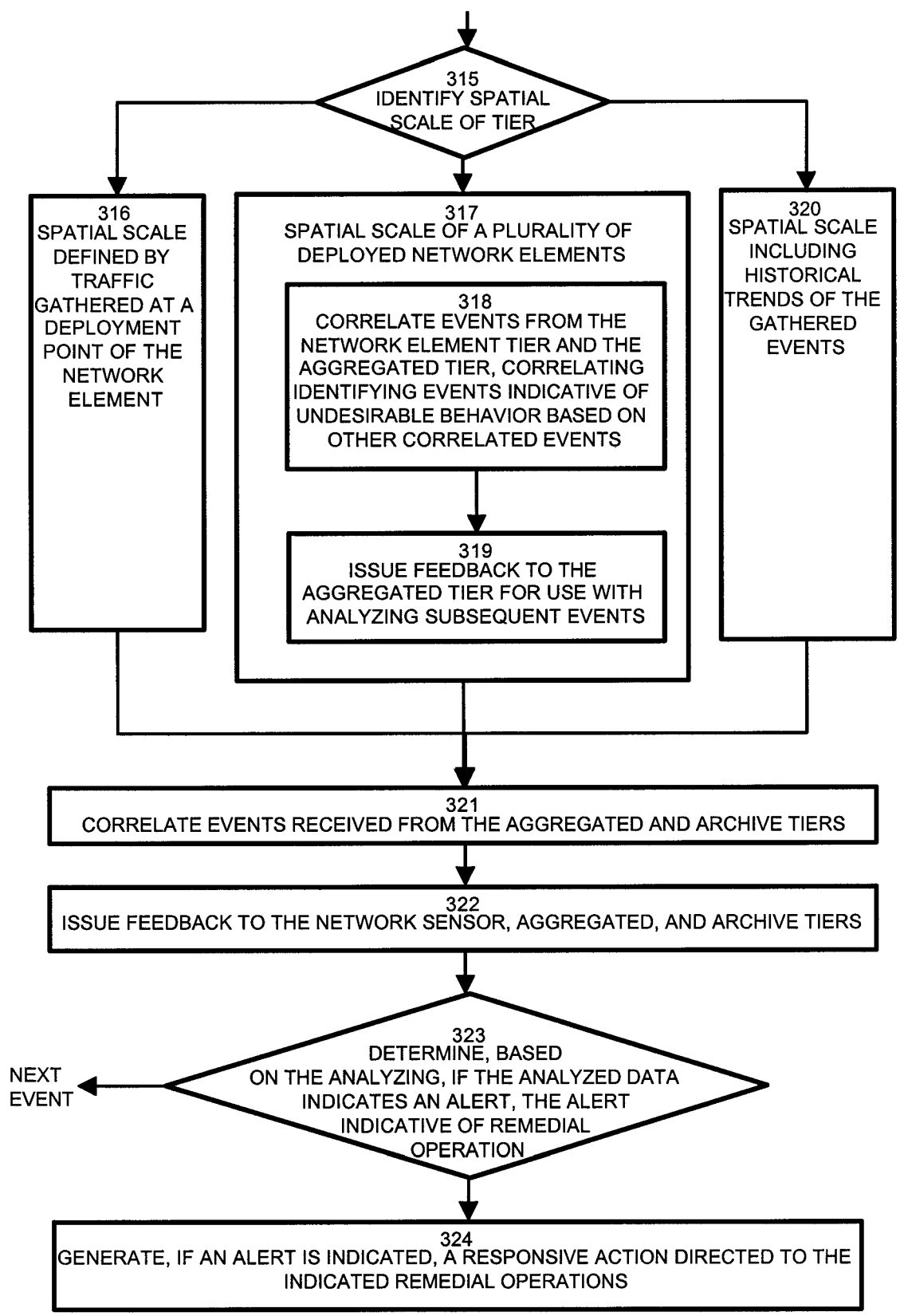

FIGS. 5-7 collectively are a flowchart of multi-tiered analysis logic according to FIG. 4. Referring to FIGS. 1-7, the example configuration 100 includes the three tiers 180, 182, 184 discussed above. In further detail, the defined plurality of tiers 180, 182, 184 are for gathering network traffic 120 in a manner such that each has a temporal scale and spatial scale independent of the others of the plurality of tiers 180, 182, 184, as depicted at step 300. In other words, one tier may be adapted to perform near instantaneous examination of a minute data item, while another tier analyzes the same data stream with the advantage of having a pattern of previous events. The plurality of tiers include a network element tier 180 for gathering and analyzing events at a line speed of the network traffic, 120 and an aggregate tier 182 for gathering and analyzing events 148 from multiple sources, as disclosed at step 301.

The analysis server 150 gathers, according to the temporal scale of each the tiers, data defining an event from the network traffic 120, as depicted at step 302. Gathering further comprises gathering according to the temporal scale of the plurality of the tiers, a plurality of events 148, as shown at step 303. As indicated above, an alert 198 may be construed by the occurrence of one or more events 148.

In the monitored environment 100, an event 148 occurs at one of the tiers, and corresponds to the temporal scale of the tier, as shown at step 304. In the example shown, since different tiers derive events from particular sources, such as the sensors 142 or the aggregator 170, in which the source of the event 148 defines the identity of the tier. It should be noted that the sequential representation of FIGS. 5-7 is exemplary, and events 148 may occur and be processed concurrently. As indicated above, the defined plurality of tiers includes a network element tier 180, such that the network element tier has element logic, in which the element logic executes at a line speed of the network traffic 120. If the event 148 was detected by a sensor 142, the network element 140 analyzes the event within a temporal scale of the line speed of the network, as depicted at step 305. The network element tier 180 includes sensors 142, in which the sensors are specialized for a predetermined purpose, and gathering includes gathering a portion of the network data 160, such that the gathered portion is predetermined according to a particular sensor 142 deployed in the respective network element (card) 140 and directed to an event 148 defined by a single condition, as disclosed at step 308.

The sensors 142 are specialized hardware devices or elements selected to identify particular packet 122 conditions, and need not necessarily sense every occurrence. In conjunction with the correlation of events 148 at multiple tiers 180, 182, 184, absolute sensing of each event-worthy condition is not required to identify a set of events derived from multiple tiers to define an alert 198. In other words, unimpeded monitoring at the line speed of the network is an acceptable tradeoff to absolute scrutiny of every packet 122. For example, a particular sensor 142 attempts to keep track of the number of peers of a particular machine. A high diversity of peers (address diversity) can be indicative of undesirable phishing or denial of service (DoS) activity. Such an algorithm need not count every single remote peer, but rather an indication that the peer count is excessive. This information, coupled (correlated) with other algorithms will trigger an alert 198. In this manner, the analysis logic 158 is not constrained by the number of peers, but rather identifies, in a nonintrusive manner, machines exhibiting a high address diversity.

In the example configuration, the sensors 142 are responsive to the element logic 158 for: examining a portion of a network traffic packet 122, in which the portion is a subset of the data in the packet 122, as depicted at step 309. Consistent with the nonintrusive operation of the sensors 142, a particular sensor 142 may advance to successive packets 122 if a particular packet 122 is incompletely analyzed within the element time scale, as disclosed at step 310.

If an event corresponds to the aggregate tier 182, at step 304, then the event is handled by the aggregated tier, in which the aggregated tier has aggregate logic 172 operating on data structures received from the network element tier, due to the aggregate logic having a temporal scale of a plurality of events, as depicted at step 306. The aggregate tier 182 includes data structures receivable from the plurality of sensors 142 in the network element tier 180, and is directed to analyzing events from multiple sources, such that the multiple sources include the plurality of network elements 140, as shown at step 311.

The aggregate tier 182 also couples to legacy data collectors 178, the legacy collectors 178 for identifying trends associated with previously identified undesirable behavior, such that the aggregate logic 172 invokes data from the legacy collectors 178 for comparison with the gathered events 160, as depicted at step 312.

In the example arrangement, the plurality of tiers further includes an archive tier 184 executing archive logic 176, in which the temporal scale of the archive logic 176 analyzes events independent of the timing of any particular attack, as depicted at step 307. The archive logic 176 may include logic similar to the aggregate logic 172, however encompassing a greater time range of events. In contrast the element logic 158, performing immediate decisions at line speed for events that are discretely undesirable, archive logic 176 is directed to alerts arising from events that may be perfectly acceptable, normal behavior as a single occurrence, but which occurring over time or in conjunction with other events 148 dictate a patter of undesirable activity.

The analysis server 150, including the event correlation analyzer 186 and the logic of each tier (element 158, aggregate 172 and archive 176) analyzes, according to the spatial scale of the tiers, the gathered network data 160, as disclosed at step 313. Such analysis includes analyzing according to the plurality of spatial scales from which the analyzed data was gathered, as depicted at step 314. Depending on the spatial scale of the respective tier, as shown at step 315, analysis occurs according to the respective logic. In the case of the element tier 180, as depicted at 316, the spatial scale is defined by traffic 120 gathered at a deployment point of the network element. In the case of the aggregate tier 182, the spatial scale encompasses a plurality of deployed network elements, as disclosed at step 317. The aggregate tier 182 invokes the aggregate logic 172 for correlating events from the network element tier 180 and the aggregated tier 182, such that correlating identifies events 160 indicative of undesirable behavior based on other correlated events 160, as shown at step 318. The event correlation analyzer 186 nay also issue feedback 191 to the aggregated tier 182 via the aggregator 170 for use with analyzing subsequent events 160, as depicted at step 319. Archive tier 184 analysis encompasses a spatial scale including historical trends of the gathered events 160, as disclosed at step 320.

In addition to processing at each tier 180, 182, 184 by the respective logic, the event correlation analyzer 192 correlates events received from the aggregated 182 and archive tiers 184 (the temporal scale of the element logic precludes timely correlation by the correlator 192, however element tier 180 events propagate via the aggregate tier 182). Based on event correlation, the event correlation analyzer 186 issues feedback 192, 191, and 194 to the network sensor 180, aggregated 182, and archive 184 tiers respectively, as shown at step 322. Based on the feedback and correlated events 160, it is determined, based on the analyzing, if the analyzed data indicates an alert 198, the alert indicative of remedial operations, as depicted at step 323. The analysis server 150 generates, if an alert 198 is indicated, a responsive action directed to the indicated remedial operations, as shown at step 324.

As indicated above, the logic employed at each tier 180, 182, 184 is selected such that complementary trends are identified, i.e. an event at one tier coupled with an event on another tier collectively indicate an alert 198. Following such an alert, the remedial actions may include, for example, dropping the packet 122, throttling the connection 130, redirecting the packet 122 to a "honeypot"—a decoy machine set up as an attractive potential target, or simply pulled offline for inspection. Example logic depicting algorithms that provide a robust arrangement of complementary processing include the following.

Content Replication Detection:

The content replication detection, or AVIDS (Anti-Virus Intrusion Detection System) algorithm detects modest-to-high levels of content replication in packet payloads, and keeps track of replication sources that are detected. Its primary application is in detecting high levels of replicated traffic due to fast-spreading viruses and worms, though it can also detect replication in spam emails if the volume is high enough. The expected threshold of detection is about 1 in 2M payload blocks (the algorithm works on 64-byte data blocks); any persistent traffic replication above this level will be detected. The AVIDS detector currently requires a threshold level of at least 64 duplicated data blocks before triggering a notification.

Host Peering Characteristics:

The host peering characteristics algorithm monitors the general peering behavior of hosts and/or external address blocks. For each host/address block, it maintains a bit-vector which is hash-indexed by the low bits of the peer address index (or address block index). The software part of the algorithm maintains various summary statistics about these bit-vectors, including a long-term histogram of the number of times each bit in the hash vector is used, which allows detection of long-term peering relationships.

Header Analysis:

This algorithm contains a collection of sanity checks on packet size and IP source and destination addresses, as well as looking for unusual packet features like options and fragmentation. It also checks checksums. This algorithm also maintains the tables that reverse address and address block indexes and flow indexes, and maintains some additional data about addresses and address blocks, such as when they were first seen. After an initial data collection period, the appearance of novel external addresses in traffic is reported by this algorithm.

Host Characterization:

The host characterization algorithm tracks aspects of internal hosts. In particular, it will track use of ports, including both well-known and commonly-used protocols, non-dynamic ports used for less common services, and dynamic ports. The data will be collected in compressed form by binning or hashing, to reduce memory requirements. Use of ports for sending and receiving will be tracked separately. This algorithm will also estimate coarse-granularity traffic flow rates inbound to, and outbound from, each internal host.

External Address Block Characterization:

This algorithm will perform the same data collection as the host characterization algorithm, but for external address blocks, instead of internal hosts. This algorithm may also include address block threat assessment, and add a simple threat estimator to the packet metadata to allow other sensors to spend more resources on packets containing higher-threat addresses. The logic also includes external data sources about external address blocks, such as address block registry information and reverse-DNS information. This information may be supplied as configuration data, queried as needed, or some combination. Analysis of the reverse-DNS name strings may provide additional useful information about the address block, such as the fact that it appears to be an access network, server hosting block, or use dynamically-assigned IP addresses.

TCP Protocol Expert:

This algorithm, colloquially called "TCP Sheppard," tracks TCP flow behavior and characterizes flows as "sheep"—flows with perfectly normal, expected behavior—and "goats"—flows with less common features, such as packet misordering, segment overlaps, and the like. It also tracks session creation and termination, TCP flags, and possibly window behavior. The tracking algorithm works with symmetric and asymmetric flows (and can work with either direction for asymmetric flows).

DNS Monitor:

This logic checks DNS packets for anomalies, and looks for changes to bindings (could be Akamai-like redirection/load-balancing, source evasion attempts, or cache poisoning. It also provides a list of IP addresses which have been DNSed recently (for cross-checks with address use in packets).

Address Diversity:

The address diversity, or entropy algorithm tracks the number of internal host/port combinations sent to by external hosts, computing an entropy value for each external host address to identify a value for remote peer diversity. It can detect scanning activity at multiple timescales. When an external host crosses a threshold entropy value of about 2.5, it is a likely scanning source. Combination of the entropy values with data from the active flows sensor (to detect failed connection ratios) seems to produce a low false-positive detector for external scanners.

ICMP Monitor:

This protocol-specific packet monitor checks for a variety of possible attack-related issues in ICMP packets. In particular, it checks for illegal, undefined, deprecated, and malformed ICMP messages, flags the use of ICMP redirects by non-routers, checks for unreasonable Path MTU messages (ICMP Destination Unreachable/Fragmentation Needed), and looks for possible covert channel use of ICMP messages. It can also detect scans that elicit ICMP messages from targeted hosts.

IGMP Monitor:

IGMP monitor logic checks for correct origin of router-sent IGMP messages, including the following: checks TTL=1; checks for attempted multicast routing (TTL>1); checks for attempted multicast group setup to many recipients; and checks for excessive number of multicast groups active (possible DoS attack on multicast NIC check).

Those skilled in the art should readily appreciate that the programs and methods for multi-tiered monitoring and analysis of a computing environment as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example as in an electronic network such as the Internet or telephone modem lines. Such delivery may be in the form of a computer program product having a computer readable storage medium operable to store computer program logic embodied in computer program code encoded thereon, for example. The operations and methods may be implemented in a software executable object or as a set of instructions embedded in an addressable memory element. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for multi-tiered monitoring and analysis of a computing environment has been particularly shown and described with references to embodiments thereof, it will be understood by those skilled in the art that various changes in form and details may be made therein without departing from the scope of the invention encompassed by the appended claims.

What is claimed is:

1. A method of gathering network traffic for analysis of undesirable trends comprising:
    defining a plurality of tiers for gathering network traffic, each of the plurality of tiers having a temporal scale and spatial scale independent of the others of the plurality of tiers, the temporal scale defining the timing of observed packets and the spatial scale defining a scope of analysis performed on observed packets, the plurality of tiers including a network element tier for gathering and analyzing events at a line speed of the network traffic, and an aggregate tier for gathering and analyzing events from multiple sources;
    gathering according to the temporal scale of the plurality of the tiers, data from the network traffic, the gathered data defining a plurality of events;
    analyzing, according to the spatial scale of at least one of the tiers, the gathered network data, analyzing including analyzing according to the plurality of spatial scales from which the analyzed data was gathered;
    determining, based on the analyzing, if the analyzed data indicates an alert, the alert indicative of remedial operations; and
    generating, if an alert is indicated, a responsive action directed to the indicated remedial operations, the network element tier comprising sensors, the sensors specialized for a predetermined purpose, and gathering comprises gathering a portion of the network data, the gathered portion predetermined according to a particular sensor deployed in the respective network element and directed to an event defined by a single condition.

2. The method of claim 1 wherein the defined plurality of tiers include a network element tier, the network element tier having element logic, the element logic executing at a line speed of the network traffic, analyzing the event within a temporal scale of the line speed and a spatial scale defined by traffic gathered at a deployment point of the network element.

3. The method of claim 2 wherein the defined plurality of tiers includes an aggregated tier, the aggregated tier having aggregate logic, the aggregate logic operating on data structures received from the network element tier, the aggregate logic having a temporal scale of a plurality of events and a spatial scale of a plurality of deployed network elements.

4. The method of claim 3 wherein the plurality of tiers further comprises an archive tier, the archive tier executing archive logic, the temporal scale of the archive logic analyzing events independent of the timing of any particular attack and the spatial scale including historical trends of the gathered events.

5. The method of claim 4 further comprising:
correlating events received from the aggregated and archive tiers; and
issuing feedback to the network sensor, aggregated, and archive tiers.

6. The method of claim 3 further comprising legacy collectors, the legacy collectors for identifying trends associated with previously identified undesirable behavior, the aggregate logic invoking data from the legacy collectors for comparison with the gathered events.

7. The method of claim 1 wherein the aggregate tier comprises data structures receivable from a plurality of sensors in the network element tier and directed to analyzing events from multiple sources, the multiple sources including the plurality of network elements.

8. The method of claim 7 further comprising:
correlating events from the network element tier and the aggregated tier, correlating identifying events indicative of undesirable behavior based on others of the correlated events; and
issuing feedback to the aggregated tier for use with analyzing subsequent events.

9. The method of claim 1 wherein the sensors are responsive to the element logic for:
examining a portion of a network traffic packet, the portion being a subset of the data in the packet; and
advancing to successive packets if a particular packet is incompletely analyzed within the element time scale.

10. The method of claim 1 further comprising deploying the sensors in the network element to analyze particular portions of the message packet, the particular portion for identifying a particular sequence residing in a subset of the entire packet.

11. The method of claim 10 wherein the sensor is specialized to identify only a specific feature such that the entire packet need not be analyzed by any particular sensor such that the sensor performs at line speed.

12. The method of claim 1 wherein the line speed at which the network elements operate is substantially on the order of 10-100 Gbs/s, and wherein:
the network element tier perform without impeding the underlying traffic flow is a priority, with the recognition that all patterns or packets may not be available within the given time window;
the aggregate tier which receives data structures populated by the sensors of the network element tier and operates on data from multiple sensors, such that multiple sensory inputs are permitted to complement each other to identify an event; and
the archive tier includes logic for analyzing current data in light of historical trends observed from previous traffic for events that are not directly tied to a single packet or occurrence.

13. A multi-tiered architecture for analyzing network traffic comprising:
a plurality of tiers for gathering network traffic, each of the plurality of tiers having a temporal scale and spatial scale independent of the others of the plurality of tiers, the temporal scale defining the timing of observed packets and the spatial scale defining a scope of analysis performed on observed packets, the tiers including:
a network element tier for gathering and analyzing events at a line speed of the network traffic;
an aggregate tier for gathering and analyzing events from multiple sources; and
an archive tier, the archive tier executing archive logic, the temporal scale of the archive logic analyzing events independent of the timing of any particular attack and the spatial scale including historical trends of the gathered events;
gathering, according to the temporal scale of at least one of the tiers, data from the network traffic, the gathered data defining an event;
element logic analyzing, according to the spatial scale of the network element tier, the gathered network data, and determining, based on the analyzing, events, the element logic executing at a line speed of the network traffic, analyzing the event within a temporal scale of the line speed and a spatial scale defined by traffic gathered at a deployment point of the network element;
aggregator logic analyzing, according to the spatial scale of the aggregate tier, the gathered network data, and determining, based on the analyzing, events;
a correlator, the correlator having correlation logic for analyzing the events from a plurality of the tiers;
determining, based on the analyzing, if the analyzed data indicates an alert, the alert indicative of remedial operations; and
generating, if an alert is indicated, a responsive action directed to the indicated remedial operations.

14. The architecture of claim 13 wherein network element tier comprises sensors, each of the sensors specialized for a predetermined purpose, and gathering comprises gathering a portion of the network data, the gathered portion predetermined according to a particular sensor deployed in the respective network element and directed to an event defined by a single condition.

15. The architecture of claim 14 wherein the sensors are responsive to the element logic for:
examining a portion of a network traffic packet, the portion being a subset of the data in the packet; and
advancing to successive packets if a particular packet is incompletely analyzed within the element time scale.

16. The architecture of claim 13 wherein the aggregate logic operates on data structures received from the network element tier, the aggregate logic having a temporal scale of a plurality of events and a spatial scale of a plurality of deployed network elements.

17. The architecture of claim 16 further comprising:
correlating events received from the aggregated tiers; and
issuing feedback to the network sensor tiers, the feedback recognized by the element logic for determining successive events.

18. The architecture of claim 13 wherein the plurality of tiers further comprises an archive tier, the archive tier executing archive logic, the temporal scale of the archive logic analyzing events independent of the timing of any particular attack and the spatial scale including historical trends of the gathered events.

19. A computer program product having computer program code on a non-transitory computer readable storage medium including a set of encoded instructions that, when executed by a processor, cause the computer to perform method of analyzing network, the method comprising:
defining a plurality of tiers for gathering network traffic, each of the plurality of tiers having a temporal scale and spatial scale independent of the others of the plurality of tiers, the temporal scale defining the timing of observed packets and the spatial scale defining a scope of analysis performed on observed packets, the plurality of tiers including a network element tier for gathering and analyzing events at a line speed of the network traffic, and an aggregate tier for gathering and analyzing events from multiple sources;

gathering according to the temporal scale of the plurality of the tiers, data from the network traffic, the gathered data defining a plurality of events;

analyzing, according to the spatial scale of at least one of the tiers, the gathered network data, analyzing including analyzing according to the plurality of spatial scales from which the analyzed data was gathered;

determining, based on the analyzing, if the analyzed data indicates an alert, the alert indicative of remedial operations; and generating, if an alert is indicated, a responsive action directed to the indicated remedial operations, the network element tier comprising sensors, the sensors specialized for a predetermined purpose, and gathering comprises gathering a portion of the network data, the gathered portion predetermined according to a particular sensor deployed in the respective network element and directed to an event defined by a single condition.

\* \* \* \* \*